Nov. 11, 1969　　　　M. LINSAY　　　　3,477,766
APPARATUS FOR TENSIONING A TRACK OR THE LIKE
Filed Aug 15, 1967　　　　2 Sheets-Sheet 1

INVENTOR.
MICHAEL LINSAY
BY Teare, Teare & Sammon
ATTORNEYS

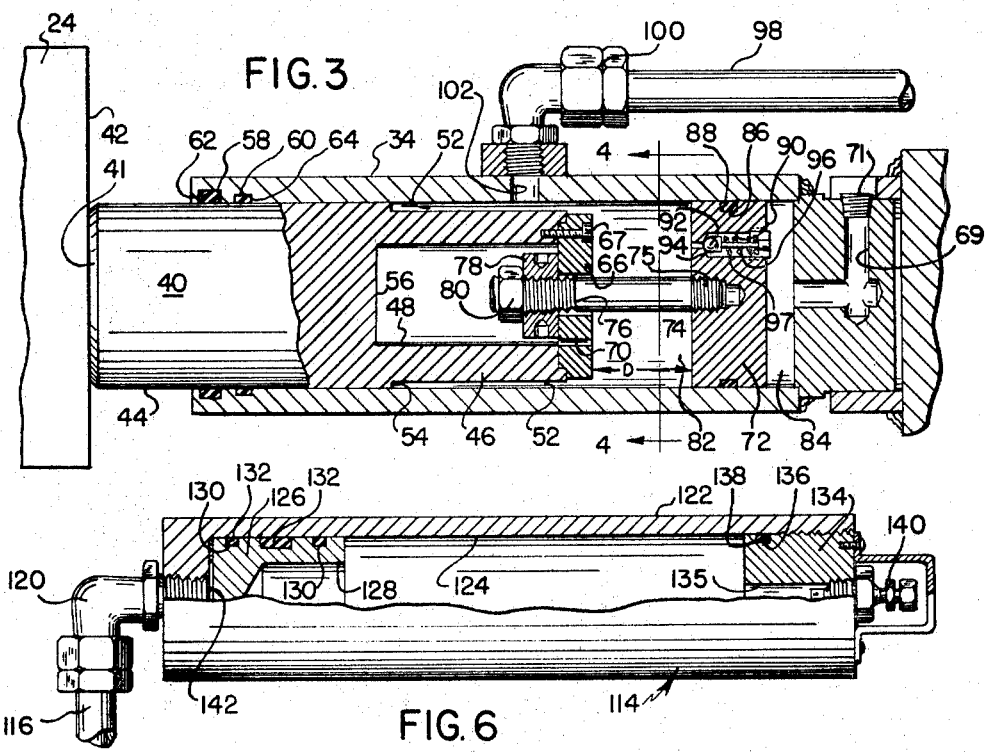
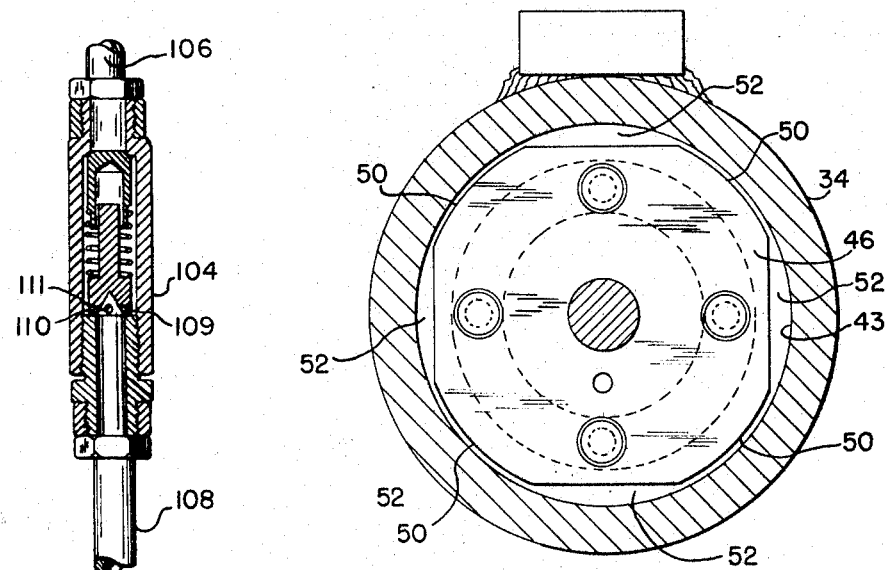
INVENTOR.
MICHAEL LINSAY
BY
Teare, Teare & Sammon
ATTORNEYS

United States Patent Office 3,477,766
Patented Nov. 11, 1969

3,477,766
APPARATUS FOR TENSIONING A TRACK OR THE LIKE
Michael Linsay, South Euclid, Ohio, assignor to The Cleveland Trencher Company, Cleveland, Ohio, a corporation of Ohio
Filed Aug. 15, 1967, Ser. No. 660,789
Int. Cl. B62d 55/30; F16h 7/10; F15b 15/26
U.S. Cl. 305—10                    11 Claims

ABSTRACT OF THE DISCLOSURE

An apparatus for adjusting the tension on a crawler track or the like of the type to be driven by a pair of sprocket wheels or the like comprising, a pair of reciprocal fluid pressure motor units disposed on either side of a respective one of the wheels and coupled in parallel to a fluid pressure source. Each motor unit includes a cylinder member and primary and secondary piston members connected together for telescopic, reciprocal movement in the cylinder member. A control valve device for automatically controlling the application of fluid pressure to the primary piston members for moving the respective wheel in a direction to tension the track. A reciprocal, gaseous fluid accumulator device coupled to the motor units for automatically controlling movement of the primary piston members when moved in a direction opposite to the tensioning movement thereof. Each secondary piston member includes a check valve device therein for the flow of fluid pressure therethrough for automatically controlling reciprocal movement of the primary piston members in a direction toward the secondary piston members.

BACKGROUND OF THE INVENTION

This invention relates to apparatus for adjusting the tension on a flexible member of the type to be driven by a pair of rotatable members, and more particularly relates to a novel apparatus for automatically and continuously adjusting the tension on a flexible member, such as a track, chain, belt, rope or the like, of the type to be driven by a pair of rotatable members, such as sprocket wheels or the like, for use with excavating machines or the like.

In the past, self-propelled vehicles or equipment of the type which employ tracks or belts, such as trenching machines, back fillers, shovels, tractors and the like, have encountered difficulties in providing and maintaining a proper tension on the track and of relieving excessive track tension, when, for instance, obstructions are caused to be wedged between the track and the idler wheels or drive sprockets of the crawler track mechanism. It is desirable to keep the track at a tension corresponding to the initial installed tension, but this has been difficult due to the elongation of the track resulting from stretch and wear of the same during normal usage thereof. Furthermore, it is desirable to prevent abrupt return or recoil movement of the component parts of the fluid powered motor units which results from sudden dislodgment of an obstruction from engagement with the crawler track so as to prevent damage to such parts and/or to the crawler track and to prevent the track from falling-off the sprocket wheels.

It has been known in excavating machines or the like to provide fluid systems for controlling and actuating the various hydraulic motor units of the vehicle which in turn actuate and control the various machine components, such as the discharge conveyor or the endless belt conveyor of the machine. Furthermore, in such arrangements, it has been known to provide fluid systems which operate to adjust the tension of the crawler tracks of the machine upon actuation of fluid-powered mechanisms, such as control valves or the like, which actuate and control the hydraulic motor units to provide the proper track tension. Heretofore, however, such systems have generally employed hydraulic actuated cylinder units mounted on the vehicle for tensioning the crawler tracks in response to actuation of the fluid-powered mechanism by the machine operator. Accordingly, in such arrangements it was necessary for the operator to actuate the respective control mechanism each time tensioning and/or slackening of the crawler tracks was required due to the fact that the fluid pressure was exhausted from the system after each work operation, such as for instance, after actuation of the discharge conveyor or the endless conveyor belt. In addition, such hydraulic cylinder units generally included only a single piston construction for tensioning the track and without any arrangement for controlling the return or recoil movement of the piston as may result, for instance, by the sudden dislodgment of an obstruction from engagement with the crawler track, thereby resulting in the track falling-off the sprocket wheels of the vehicle.

SUMMARY OF THE INVENTION

This invention relates to an apparatus for automatically and continuously controlling and/or maintaining a predetermined tension on a flexible member, such as a crawler track or the like, of the type to be driven by a pair of rotatable members, such as sprocket wheels or the like, comprising, reciprocal fluid actuated motor means operably coacting with one of said rotatable members for moving the latter in a direction to tension the flexible member in response to actuation of said motor means from a source of fluid pressure, and means coupled to the motor means for automatically and continuously controlling the application of fluid pressure to said motor means so as to maintain a substantially constant predetermined tension on said flexible member. Reciprocable fluid accumulator means are coupled to the motor means for controlling movement of the motor means when the latter is moved in a direction opposite to the tensioning movement thereof. Each motor means comprises first and second piston members disposed for telescopic, reciprocal movement in a cylinder member and connecting means coupling said piston members together to enable relative movement thereof with respect to one another and/or to enable movement, as a unit, thereof when moved in the same direction, and a check valve means disposed in said second piston members to control the flow of fluid pressure therethrough, thereby to control reciprocal movement of the first piston member in a direction toward such second piston member.

The present invention provides a novel apparatus and/or system for continuously and automatically applying and/or maintaining tension on a flexible member, such as a crawler track, so that the tension is maintained at the proper initial installed tension thereof. In addition, the apparatus and/or system of the present invention operates to continuously and automatically maintain such proper tension which may otherwise vary by reason of elongation of the flexible member due to wear or stretching thereof. Furthermore, when applied for tensioning a crawler track or the like for an excavating machine, the apparatus and/or system of the present invention continuously and automatically controls the extent of the return or recoil movement of the piston members which may result from dislodgment of an obstruction from engagement with the crawler track, thereby to prevent damage to the component parts of the fluid motor units and to prevent the crawler from falling-off the sprocket wheels of the vehicle. The apparatus and/or system of the present invention is continuously and automatically actuatable and does not require independent, manipulative operation by the operator, as has heretobefore been the case with prior systems. The apparatus and/or system of the present invention is simple to actuate and control, incorporates a rugged and durable construction which is easy to maintain, and which increases the operating efficiency of the vehicle, such as an excavating machine, to which it is applied.

BRIEF DESCRIPTION OF THE DRAWINGS

FIG. 3 is a fragmentary, section view on an enlarged scale showing one of the reciprocal fluid actuated motor means of the invention removed from the assembly of FIG. 2;

FIG. 4 is a vertical cross-section view, on an enlarged scale, taken along the line 4—4 of FIG. 3;

FIG. 5 is a fragmentary, front elevation view, on an enlarged scale, showing the control valve means of the present invention removed from the assembly of FIG. 2; and FIG. 6 is a fragmentary view, partly in section and on an enlarged scale, showing the reciprocal fluid accumulator means of the invention removed from the assembly of FIG. 2.

DESCRIPTION OF THE PREFERRED EMBODIMENTS

Figure 1:
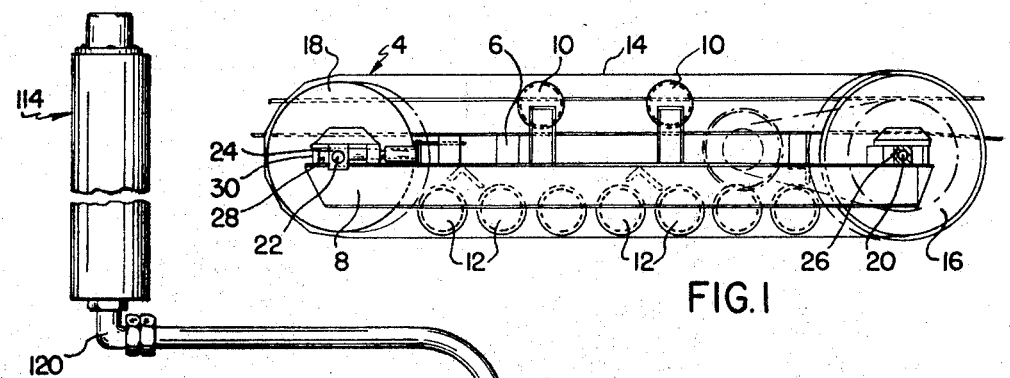
FIG. 1 is a fragmentary, side elevational view of one side of a crawler-mounted machine particularly illustrating in generally diagrammatic form, the crawler track mechanism thereof, and embodying the fluid actuated, track-adjusting apparatus of the invention.

Referring again to the drawings, and in particular to FIG. 1 thereof, there is illustrated a track-adjusting apparatus, designated generally at 2, for use with a crawler-type excavating machine. The track-adjusting apparatus of the present invention is adapted for application to any track propelled vehicle, such as for instance, a mobile trenching machine, back filling machine, tractors and the like. However, the principles involved herein can be employed with any other types of machines which may include driving and driven components, such as sprockets, wheels or the like, connected by a flexible member, such as a track, chain, belt, rope or the like, which transmits the force and/or movement from the driving to the driven component thereof.

As shown, the excavating machine (only a portion being shown) includes a frame 4 having transversely extending frame members 6 (FIGS. 1 and 2), the outer ends of which are supported on a lengthwise extending frame assembly 8 of the crawler track assembly. It being understood that there is a crawler track assembly disposed on both sides of the machine, but with only one such assembly being shown in FIG. 1. A plurality of rotatably mounted upper 10 and lower 12 track engaging wheels are supported by the frame assembly 8 in a conventional manner as known in the art.

Figure 2:
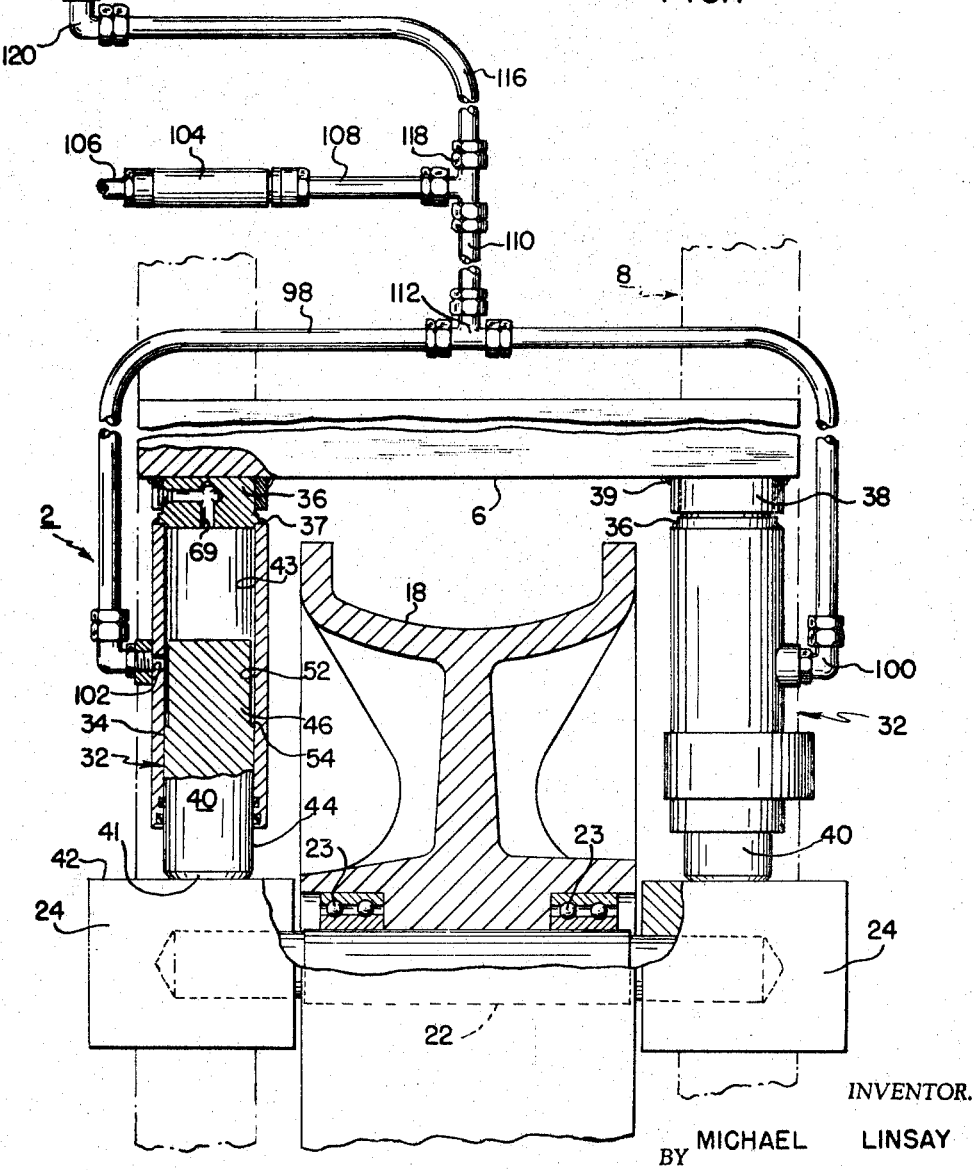
FIG. 2 is a fragmentary, top plan view, partly in section, showing the apparatus of the invention mounted on the crawler track mechanism, for actuating or moving an idler sprocket wheel of the track mechanism for adjusting the tension in the track in accordance with the invention.

In the embodiment illustrated, each crawler track 14 is looped about and supported by longitudinally spaced drive sprocket 16 and an idler sprocket 18 wheels, each of which is rotatably mounted on respective shafts 20 and 22. The idler sprocket wheel 18 is rotatably mounted on its shaft 22 by means of suitable ball bearings 23, as seen in FIG. 2. The crawler track 14 may be driven from the prime mover of the machine, which generally comprises an internal combustion engine (not shown), and may be operably coupled to the respective drive sprocket wheel 16.

In the invention, the outer ends of the respective shafts 20 and 22 are mounted in block-type bearings 24 and 26 supported on the frame assembly 8. Blocks 26 are generally mounted in fixed relation on the frame assembly 8 while the blocks 24 which support the shaft 22 of the idler sprocket wheel 18 are slidably mounted for relative lengthwise movement on the frame assembly 8. As best seen in FIG. 1, the blocks 24 which are disposed on opposite sides of the idler sprocket wheel 18 (FIG. 2) are each disposed in an elongated slot 28 (FIG. 1) provided in the frame assembly 8 and have a stop member 30 for limiting outward movement of the respective blocks 24.

Now in accordance with the invention, the track-adjusting apparatus 2 includes fluid actuated motor units, designated generally at 32 (FIG. 2). The motor units 32 are of identical construction mounted in supported relation on the frame assembly 8 on opposite sides of the idler sprocket wheel 18, as seen in FIG. 2. As shown, each unit comprises an elongated cylinder member 34 having an annular plug member 36 attached thereto, such as by weldments 37. The plug member 36 is supported telescopingly within an annular collar or ring 38 which may be fixedly attached, as by weldments 39, to one of the frame members 6. A primary piston member 40 is disposed in the other end of the cylinder member 34 for telescopic, reciprocal movement with respect thereto. The front end surface, as at 41, of the piston member 40 is adapted to engage the confronting surface 42 of the respective bearing blocks 24 so that the piston member is operative to move the block longitudinally and outwardly in a direction toward the stop member 30 upon introduction of fluid pressure into the bore 43 of the cylinder member 34, thereby taking up any slack in the track and maintaining a predetermined tension thereon, as will hereinafter be more fully described.

The primary piston member 40 may be a solid cylinder as shown in FIG. 2, or as shown in FIG. 3, may include a solid, cylindrical nose portion 44 at the front end, and an integral hollow sleeve or barrel portion 46 at the other end which is defined by a cylindrical fluid receiving chamber 48. As best seen in FIG. 4, the barrel portion 46 may be polygonal, such as rectangular in transverse cross-section, having rounded corner portions, as at 50, so as to correspond in contour to the inner cylindrical surface of the bore 43 of cylinder member 34. By this arrangement, a plurality, such as four (4), circumferentially spaced passageways 52 (FIG. 4) are provided between the exterior surface of the barrel portion 46 and the confronting inner surface of the cylindrical member 34. The passageways 52 extend lengthwise of the barrel portion 46 and communicate with the bore 43 of the cylinder member 34. Preferably, the passageways 52 terminate inwardly of the bore 43 in an annular shoulder portion 54. The passageways 52 are generally co-extensive in length with the piston chamber 48 which chamber terminates in a closed end portion 56. Accordingly, the effective fluid working area of the barrel portion 46 corresponds to the transverse cross-sectional area of the piston member 40 as taken through the nose portion 44 thereof.

As best seen in FIG. 3, the forward end of the cylinder member 34 may be provided with a pair of axially spaced, circumferentially extending grooves 58 and 60 which contain resilient sealing members 62 and 64, such as O-rings which provide a fluid seal between the cylinder 34 and piston member 40. The rearward end of the piston member 40 is provided with a removable closure plate 66 (FIG. 2) which is connected to the barrel portion 46 and over the open end of the chamber 48 as by means of suitable fasteners 67, such as bolts or the like. The closure plate 66 is provided with an axially extending passageway 70 so as to provide ingress and egress of fluid pressure to and from the chamber 48.

The plug member 36 (FIG. 2) is provided with a passageway 69 which opens at one end into the bore 43 of the cylinder member 34 and which is adapted to communicate at its other end with the exterior of the cylinder member 34. This open end of the passageway 69 may be selectively closed by a removable plug 71, such as a threaded screw, to facilitate drainage of fluid from the cylinder member 34, as desired.

Now in accordance with another form of the invention, a secondary piston member 72 (FIG. 3) is disposed for telescopic, reciprocal movement within the cylinder member 34. As shown, the piston member 72 is also of a cylindrical construction, but has an axial length substantially less than that of the primary piston member 40. As shown, the piston member 72 has a length about one-fifth the length of the primary piston member 40. An elongated, axially extending rod 74 is threadably attached, as at 75, at one end to the secondary piston member 72 and is slidably disposed at its other end through an opening 76 provided in the closure plate 66 mounted on the primary piston member 40. A stop in the form of an annular collar 7 is mounted on the free end of the rod 74 with respect to the primary piston member 40. In addition, a suitable fastener 80, such as a nut, may be threadably attached to a threaded end of the rod 74 to prevent axial shifting movement of the stop collar 78. Accordingly, the primary piston member 40 is disposed for free sliding movement on the connecting rod 74 toward and away from the secondary piston member 72 for the purposes as will hereinafter be described.

As best seen in FIG. 3, the secondary piston member 72 divides the bore 43 of the cylinder member 34 into a pair of spaced cavities 82 and 84 which have a transverse cross-sectional area equal to the effective working area of both the primary and secondary piston members. Moreover, the piston members 40 and 72 are coupled together in tandem relationship via the connecting rod 74 so that they may move axially toward and away from one another or may move together, as a unit, upon the introduction of pressurized fluid into the cavity 82 for limiting the return or "recoil" movement of the primary piston member 40 upon dislodgment of an object, such as a rock or the like, which may be disposed in the space between the track 14 and the sprocket wheels 16, 18 of the vehicle.

The secondary piston member 72 is provided with an annular groove 86 for receiving a resilient sealing element 88, such as an O-ring, disposed therein to provide fluid sealing engagement between the piston and the confronting inner surface of the cylinder member 34. Preferably, the secondary piston member 72 is provided with a check valve device for controlling the flow of pressurized fluid from the cavity 82 into the cavity 84. As shown, in FIG. 3, the device may comprise a fluid passageway 90 extending axially therethrough and communicating at its ends with the cavities 82 and 84. A check member 92, such as a ball valve, may be disposed in the passageway 90 and held in resilient seated engagement against the valve seat 94 by means of a resilient element 97, such as a coiled spring, mounted on a rod 96. By this arrangement, pressurized fluid introduced into the cavity 82 is enabled to flow into the cavity 84 via the check valve device, but is prevented from flowing back into the cavity 82, thereby limiting axial movement of the secondary piston member 72 in a direction toward plug member 36 of the cylinder member 34.

Fluid under pressure, such as oil or the like, may be applied to the motor units 32 by means of a fluid hydraulic system. Such system may include a fluid transmission line 98 connected by means of threaded couplings 100 to the respective cylinder members 34. The cylinder members 34 may each be provided with an inlet opening 102 which communicates with the passageways 52, thereby introducing fluid under pressure into the bore 43 (FIG. 2) or cavity 82 (FIG. 3) from a supply source (not shown), which may be mounted on the vehicle. The fluid transmission line 98 is of a construction so that the motor units 32 are connected in parallel on either side of the idler sprocket wheel 18, whereby the primary piston members 40 are driven simultaneously outwardly, thereby shifting the bearing blocks 24 on either side of the idler sprocket wheel 18 forwardly in a direction to tension the crawler track 14. A check valve 104 which may be of a conventional well-known type (FIG. 5) may be adapted to be connected at one end via inlet conduit 106 to the supply source and at its other end via conduit 108 to another transmission line 110. The transmission line 110 may be coupled, as at 112, to the transmission line 98. The inlet conduit 106 may be adapted to be connected to the supply source which may include a pump unit (not shown). The pump unit may be driven from the prime power unit of the vehicle in a manner well-known in the art or by any other suitable means. By this arrangement, fluid under pressure may be continuously delivered from the supply source through the check valve 104 via apertures 109 to 111 and simultaneously to the motor units 32 by flow of fluid pressure in one direction, but the check valve 104 prevents the flow of fluid pressure in the opposite direction, thereby preventing fluid pressure from leaving the hydraulic system.

In accordance with the invention, any suitable accumulator device, such as the construction shown in FIG. 6, may be employed. As shown, the accumulator device 114 is connected to the transmission line 110 by a conduit 116. As shown, the conduit 116 is coupled, as at 118, to the transmission line 110 and, as at 120, to the accumulator 114. As best seen in FIG. 6, the accumulator device 114 is connected to the transmission line 110 by a conduit 116. As shown, the conduit 116 is coupled, as at 118, to the transmission line 110 and, as at 120, to the accumulator 114. As best seen in FIG. 6, the accumulator device 114 includes a casing or cylinder member 122 having a gaseous fluid receiving chamber 124 therein. A piston member 126 is disposed for telescopic, reciprocating movement within the chamber 124. As shown, the piston member 126 may be of cylindrical construction having a cavity 128 opening into the chamber 124. The piston member 126 includes a series of axially spaced, annular grooves 130 which receive therein resilient sealing elements 132, such as O-rings, to provide a fluid sealing engagement between the piston member and the confronting interior surface of the cylinder member 122.

The rearward end of the cylinder member 122 may be provided with a threaded plug member 134 having an inlet passageway 135 communicating with the chamber 124. The plug member 134 may be provided with an angular groove 136 for receiving therein a resilient sealing element 138, such as an O-ring, to prevent the egress of gaseous fluid pressure from within the chamber 124. An inlet nozzle 140 may be mounted on the cylinder member 122 so as to extend into gaseous fluid communication with the passageway 135 for introducing a gaseous fluid into the chamber 124. The other end of the cylinder member 122 may be provided with an opening 142 which communicates via conduit 116 with the transmission lines 110 and 98 and hence, with the respective motor units 32. Preferably, the chamber 124 is filled via nozzle 140 with a gaseous fluid, such as nitrogen, at a pressure which is preferably greater than the operating fluid pressure of the system. Hydraulic fluid pressure entering the chamber 124 via opening 142 causes the piston member 126 to move to the right, thereby compressing the gaseous fluid in the chamber 124. This increased pressure within the chamber 124 sets up, in effect, a back pressure which is transmitted through the system which in turn increases resistance to movement of and imparts a restoring force to the primary piston members 40 of the motor units 32 upon dislodgement of an object between the crawler tracks and the sprocket wheels of the vehicle.

In a typical application for continuously and automatically maintaining the crawler tracks 14 in proper tensioned condition, reference may be had to FIGS. 1 and 2 of the drawings wherein fluid under pressure, such as for instance in the range between about 500 p.s.i. to 1,000 p.s.i., may be introduced from the supply source via the check valve 104, conduit 108, and transmission lines 110 and 98 into the bore 43 of the cylinder members 34 and via passageways 52 into the chambers 48 of the primary piston members 40 via passageways 70. This pressurized fluid acting on the effective working area of the primary piston members 40 serves to move the same in an axial direction toward the left so as to cause the slidably mounted bearing blocks 24 to move in the same direction, thereby pushing the idler sprocket wheels 18 outwardly for exerting a predetermined tension on the respective crawler track 14. In the event that the track elongates, such as due to wear or stretching thereof, the pressure on the motor unit 32 side of the check valve 104 drops below the supply pressure. This drop or pressure gradient causes additional flow of pressurized fluid via check valve 104 from the supply source and thereby operates to continue outward movement of the primary piston members 40 and hence, to maintain proper tension on the crawler track 14 until a balanced equilibrium of the hydraulic system is again restored.

When an object, such as a rock, piece of wood, dirt build-up or the like, becomes lodged between the crawler track 14 and any one of the respective sprocket wheels 16, 18 for instance, the respective track is tensioned (as by elongation) which causes the respective idler sprocket wheel 18, bearing blocks 24 and hence, the piston members 40 of the respective motor units 32 to be pushed back to the right (FIGS. 1 and 2). Retraction of the piston members 40 in this manner causes the hydraulic fluid in the bores 43 of the cylinder members 34 to flow outwardly through passageways 52, and opening 102 via transmission lines 98 and 110 back in a direction toward the accumulator device 114 via conduit 116. The check valve 104 prevents any such hydraulic fluid flow from escaping from the system. Hydraulic fluid flowing into the cavity 124 of the accumulator device 114 via opening 142 causes the piston member 126 thereto move to the right (FIG. 6) so as to compress the gaseous fluid contained in the cavity 124. Preferably, the gaseous fluid contained in the accumulator device is maintained at a pressure which is above the fluid operating pressure of the system, such as for instance, at a pressure of about 2,000 p.s.i. when the hydraulic operating system pressure is in a range from about 500 p.s.i. to 1,000 p.s.i. Such compression of the gaseous fluid within the accumulator device 114 acts to set up what is, in effect, an increased back pressure which is transmitted back through the system via conduit 116 and transmission lines 110 and 98 into the bores 43 of the respective cylinder members 34. This increased back pressure acts upon the effective working area of the primary piston members 40 which imparts thereto a predetermined increased resistance to the retractive or return movement thereof. Hence, when the object is suddenly dislodged from between the crawler track 14 and the respective sprocket wheels 16, 18, this increased back pressure, acting upon the effective working area of the piston members 40, imparts an additional restoring force to the bearing blocks 24 upon engagement therewith by the piston members 40 so as to force the respective idler sprocket wheels 18 and hence, the crawler track 14 back into its initial position, such as prior to encountering the object. Moreover, by proper selection of the accumulator size and the pre-charge pressure on the gaseuos fluid contained in the accumulator, the character of the restoring force imparted to the primary piston members 40 can be predetermined so as to accommodate various working conditions, as desired.

Accordingly, by the foregoing arrangement a predetermined tensioning force is continuously applied to the track which maintains the track at the proper tension as when initially installed and, as the track elongates due to wear, stretching or the like, it is automatically adjusted for such change in length while at the same time being maintained in this proper initial tensioned condition. Since this operation is continuous, it does not rely upon or require activation by an operator by independent actuation of a component, such as a motor, each time a change in condition occurs during operation of the vehicle, as has been the case with heretofore known systems.

In cases where it is desirable to control the extent of the retractive movement or the recoil stroke of the primary piston members 40, such as upon sudden dislodgment of an object from engagement with the crawler track in the manner as aforementioned, it is preferred to incorporate into the motor units 32 the secondary piston ararngement, as described in connection with FIG. 3. In such case, the respective crawler track 14 may be provided with the proper tension by introducing hydraulic fluid via inlet control valve 104 and transmission lines 110 and 98 (FIG. 1) into the front cavities 82 of the respective cylinder members 34 and into the chambers 48 of the primary piston members 40 so that the latter is moved forwardly, thereby acting to pull the secondary piston members 72 in tandem relationship therebehind due to the inter-coupling therebetween by reason of connecting rods 74. The hydraulic fluid displaced by forward movement of the secondary piston members 72 flows into the end cavities 84 via check valves 90, 92, 94 and 96 which valves also prevent any return flow of hydraulic fluid into the forward cavities 82. Forward movement of the respective primary piston members 40 pushes against the respective bearing blocks 24 mounting the associated idler sprocket wheel 18 for maintaining a continuous tension on the crawler track 14, as aforesaid.

When an object is encountered by the crawler track 14 of the vehicle, the idler sprocket wheel 18, bearing blocks 24 and hence, the primary piston members 40 are again pushed back to the right (FIG. 3). In this form, however, the secondary piston members 72 remain substantially stationary and in generally fixed relationship with respect to the cylinder members 34 due to the hydraulic fluid pressure in the end cavities 84. The primary piston members 40 are enabled to move toward the secondary piston members 72 because of their free sliding connection on the connecting rods 74 which extend axially from the secondary piston members 72. This retractive movement of the primary piston members 40 in a direction toward the secondary piston members 72 displaces hydraulic fluid in the front cavities 82 which causes the displaced fluid to flow via transmission lines 98 and 110 and conduit 116 back to the accumulator device 114 which again acts to impart an increased restoring force to the primary piston members 40 in the manner described in connection with FIGS. 1 and 2. Here again, the control valve 104 prevents any leakage of hydraulic fluid pressure from the system. In this form, however, the retractive or recoil movement of the primary piston members 40 within the associated cylinder members 34 is effectively controlled by reason of the substantially stationary or fixed disposition of the associated secondary piston members 72 with respect to the cylinder members 34 caused by the hydraulic fluid pressure in the rear cavities 84. Hence, the primary piston members 40 move toward the secondary piston members 72 until the restoring force imparted by the accumulator device 114 prevents further movement thereof, or until the primary piston members 40 are brought into abutting engagement with the confronting surface of the secondary piston members 72. Thus, the maximum return or recoil movement of the primary piston members 40 can be no greater than the distance D (FIG. 3), which distance corresponds to the maximum initial axial distance between the pirmary 40 and secondary 72 piston members of each motor unit. For example, this distance D may be between about 1 inch to 2 inches depending upon the size of the motor unit employed for a particular application. Accordingly, when an obstruction is suddenly displaced from engagement with the crawler tracks 14, the system acts to automatically control the extent of return or recoil movement of the primary piston members 40 so as to prevent damage to the component parts of the motor unit and/or to the crawler tracks which may otherwise fall-off the sprocket wheels of the vehicle.

Though in the foregoing embodiments, the motor units 32 incorporating relatively small piston and cylinder arrangements have been illustrated as engaging bearing blocks on either side of the respective idler sprocket wheels 18, it is to be understood that any number of such units may be employed or a single motor unit incorporating a relatively large piston and cylinder arrangement may be employed, such as by means of a yoke arrangement, for engagement with the bearing blocks in accordance with the present invention.

The terms and expressions which have been used are used as terms of description and not of limitation and there is no intention in the use of such terms and expressions of excluding any equivalents of any of the features shown or described, or portions thereof, but it is recognized that various modifications are possible.

I claim:
1. An apparatus for tensioning a flexible member of the type adapted to be driven by a pair of rotatable members comprising,
reciprocal fluid actuated motor means operably coacting with one of said rotatable members for moving the latter in a direction to tension said flexible member,
a source of pressurized fluid,
fluid transmision line means coupling said motor means to said source,
said motor means including a hollow cylinder member adapted to receive pressurized fluid from said source,
a primary piston member disposed for telescopic, reciprocal movement in said cylinder member and adapted for moving at least one of said rotatable members to tension said flexible member,
a movable stop means including a secondary piston member disposed for telescopic, movement in said cylinder member in one direction and releasably restrained against movement in the opposite direction,
an adjustable connecting means coupling said primary and secondary piston members together at an initial predetermined axially spaced distance from one another, and
said primary piston member being movably secured to said connecting means and said secondary piston member being fixedly secured to said connecting means to enable said piston members to move, as a unit, in one direction with said predetermined axial spacement therebetween and to enable said primary piston member to move toward said secondary piston member through said predetermined axial spacement when moved in the opposite direction, whereby said secondary piston member acts as a stop for said primary piston member.

2. An apparatus in accordance with claim 1, wherein said primary piston member includes a hollow chamber at one end thereof, and
said connecting means being attached at one end to said secondary piston member and disposed at its other end for sliding movement into the chamber of said primary piston member upon movement of said primary piston member in a direction toward said secondary piston member.

3. An apparatus in accordance with claim 1, wherein said primary and secondary piston members are adapted to be disposed in axially spaced relationship within said cylinder member so as to define a first cavity between said primary piston member and said secondary piston member, and a second cavity between said secondary piston member and a closed end of said cylinder member, and
said secondary piston member including check valve means to enable flow of pressurized fluid from said first cavity into said second cavity and to prevent flow of pressurized fluid from said second cavity into said first cavity.

4. An apparatus in accordance with claim 1, wherein said primary piston member is of an elongated, cylindrical construction,
one end of said piston member being adapted to extend axially outwardly from said cylinder member and the other end being adapted to be disposed in said telescopic, relationship within said cylinder member,
the latter end of said primary piston member being of a polygonal cross-sectional configuration defining a plurality of circumferentially spaced passageways extending axially thereof and communicating with the interior of said cylinder member, and
inlet means in said cylinder member communicating said passageways with said fluid transmission line means.

5. An apparatus in accordance with claim 1, including
reciprocal fluid accumulator means, and
other fluid transmision line means coupling said accumulator means to said first mentioned fluid transmission line means for controlling movement of said motor means when the latter is moved in a direction opposite to said tensioning movement thereof.

6. An apparatus in accordance with claim 5, wherein said accumulator means includes a hollow casing,
one end of said casing being adapted to communicate with a source of gaseous fluid pressure and the other end being coupled to said other fluid transmission line means, and
a piston member disposed for telescopic, reciprocal movement within said casing.

7. An apparatus in accordance with claim 6, wherein the gaseous fluid media contained in said casing is maintained at a pressure greater than the pressure of the pressurized fluid introduced into said motor means from said source.

8. An apparatus in accordance with claim 1, wherein said primary piston member includes a hollow end portion,
a closure member having an opening therein attached to said hollow end portion,
said connecting means including an elongated rod attached at one end to said secondary piston member and extending axially toward its other end through the opening in said closure member, and
an abutment means mounted on the free end of said rod adapted for engagement with the confronting interior surface of said closure member upon movement of said primary piston member in a direction away from said secondary piston member.

9. An apparatus in accordance with claim 8, wherein said closure member includes passageway means therein to enable flow of pressurized fluid to and from said hollow end portion of said primary piston member.

10. An apparatus in accordance with claim 1, wherein said motor means comprises a pair of reciprocal fluid powered motor units disposed on either side of the associated rotatable member, and
said fluid transmission lines coupling said motor units in parallel to said source.

11. An apparatus in accordance with claim 10, including
a frame,
said motor means being mounted on said frame, and
movable bearing means mounting said rotatable members on said frame for lengthwise movement of the frame upon actuation of said motor units.

(References on following page)

References Cited

UNITED STATES PATENTS

| | | | |
|---|---|---|---|
| 2,837,378 | 6/1958 | Williams | 305—10 |
| 2,899,938 | 8/1959 | Gardner | 92—128 X |
| 2,976,844 | 3/1961 | Goldring | 92—13 |
| 3,008,772 | 11/1961 | Helsel | 305—10 |
| 3,065,734 | 11/1962 | Molzahn | 92—128 |
| 3,082,043 | 3/1963 | Orton | 305—10 |
| 3,101,977 | 8/1963 | Hyler | 305—10 |
| 3,108,387 | 10/1963 | Penote | 305—10 X |
| 3,116,956 | 1/1964 | Maradyn | 305—10 X |

RICHARD J. JOHNSON, Primary Examiner

U.S. Cl. X.R.

74—242.14; 92—13, 165, 177